(12) United States Patent
Yoo (10) Patent No.: US 11,850,499 B2
(45) Date of Patent: Dec. 26, 2023

(54) AUGMENTED REALITY BASED INTERACTIVE SPORTS DEVICE USING LIDAR SENSOR

(71) Applicant: TWOHANDSINTERACTIVE CO., LTD., Busan (KR)

(72) Inventor: Wangyun Yoo, Busan (KR)

(73) Assignee: TWOHANDSINTERACTIVE CO., LTD., Busan (KR)

( * ) Notice: Subject to any disclaimer, the term of this patent is extended or adjusted under 35 U.S.C. 154(b) by 0 days.

(21) Appl. No.: 18/019,813

(22) PCT Filed: Oct. 29, 2020

(86) PCT No.: PCT/KR2020/014925
§ 371 (c)(1),
(2) Date: Feb. 5, 2023

(87) PCT Pub. No.: WO2022/080548
PCT Pub. Date: Apr. 21, 2022

(65) Prior Publication Data
US 2023/0241483 A1     Aug. 3, 2023

(30) Foreign Application Priority Data
Oct. 12, 2020   (KR) .................. 10-2020-0131501

(51) Int. Cl.
*A63B 71/06* (2006.01)
*A63B 24/00* (2006.01)
(Continued)

(52) U.S. Cl.
CPC ...... *A63B 71/0622* (2013.01); *A63B 24/0075* (2013.01); *G01S 17/89* (2013.01);
(Continued)

(58) Field of Classification Search
CPC ............ A63B 71/0622; A63B 24/0075; A63B 2071/0625; A63B 2071/0636;
(Continued)

(56) References Cited

U.S. PATENT DOCUMENTS

2008/0218641 A1* 9/2008 Kjeldsen ................ G03B 21/28
348/746
2019/0121522 A1* 4/2019 Davis .................... G06V 40/28
(Continued)

FOREIGN PATENT DOCUMENTS

KR    20170008896 A    1/2017
KR    20190055364 A    5/2019
(Continued)

OTHER PUBLICATIONS

International search report of PCT/KR2020/014925, dated Jul. 9, 2021, English translation.

*Primary Examiner* — Jeffrey S Vanderveen
(74) *Attorney, Agent, or Firm* — STIP Law Group, LLC (57) ABSTRACT

According to an augmented reality based interactive sports device using a LiDAR sensor proposed in the present invention, it is possible to allow enjoying sports indoors only with the user's body without requiring a user to wear a separate object or device by projecting an image for sports content on the floor and tracking a user motion of the sports content using the LiDAR sensor to control the interaction between the sports content and the user, allow using the floor surface efficiently due to wide range of motion tracking, and allow quickly and accurately tracking a motion of each user by tracking a user motion using two LiDAR sensors even when multiple users are using sports content at the same time.

6 Claims, 8 Drawing Sheets

(51) Int. Cl.
  *G01S 17/89* (2020.01)
  *G06F 3/01* (2006.01)
(52) U.S. Cl.
  CPC ...... *G06F 3/011* (2013.01); *A63B 2071/0625* (2013.01); *A63B 2071/0636* (2013.01); *A63B 2220/803* (2013.01); *A63B 2220/805* (2013.01); *A63B 2220/89* (2013.01); *A63B 2225/20* (2013.01); *A63B 2225/50* (2013.01)
(58) Field of Classification Search
  CPC ........ A63B 2220/803; A63B 2220/805; A63B 2220/89; A63B 2225/20; A63B 2225/50; A63B 2024/0096; A63B 2071/0638; G01S 17/89; G06F 3/011; G06F 3/0304; Y02A 90/10; G06Q 50/10; G06Q 50/22; G06T 7/246; G06T 19/006
  See application file for complete search history.

(56) References Cited

U.S. PATENT DOCUMENTS

| | | | | |
|---|---|---|---|---|
| 2020/0075707 A1* | 3/2020 | Ko | ....................... | H10K 10/481 |
| 2021/0072818 A1* | 3/2021 | Liu | ......................... | G06F 3/017 |

FOREIGN PATENT DOCUMENTS

| | | |
|---|---|---|
| KR | 102088333 B1 | 3/2020 |
| KR | 20200075707 A | 6/2020 |
| KR | 20200082990 A | 7/2020 |
| KR | 20200092389 A | 8/2020 |
| KR | 102233395 B1 | 3/2021 |
| WO | WO2010015274 A1 | 2/2010 |

* cited by examiner

FIG. 8

AUGMENTED REALITY BASED INTERACTIVE SPORTS DEVICE USING LIDAR SENSOR

CROSS-REFERENCE TO RELATED APPLICATIONS

This application is the U.S. National Phase under 35 U.S.C. § 371 of International Application No. PCT/KR2020/014925, filed on Oct. 29, 2020, which in turn claims the benefit of Korean Application No. 10-2020-0131501, filed on Oct. 12, 2020, the disclosures of which are incorporated by reference into the present application.

TECHNICAL FIELD

The present invention relates to an augmented reality based interactive sports device and, more particularly, to an augmented reality based interactive sports device using a LiDAR sensor.

BACKGROUND ART

As science advances, overall physical activity of modern people is declining, and most modern people lack sufficient activity. In particular, the population with adult diseases such as obesity is continuously increasing. In addition, as outdoor activities are restricted due to rapid weather changes, environmental pollution, fine dust, and infectious diseases, there is an increasing interest in exercise that allows enjoying sufficient physical activity indoors.

The most common exercise that can be done indoors is physical fitness. Physical fitness refers to creating a healthy and balanced body or performing exercise for the purpose thereof. Such fitness is generally done under personal guidance from a professional trainer in a fitness center equipped with professional equipment. However, it is difficult for modern people to visit a fitness center and regularly receive personal guidance from a professional trainer due to their busy daily life. In addition, it is very difficult to maintain fitness due to the high tuition fees.

Meanwhile, since exercise is done using equipment in general fitness, there is a risk of injury due to wrong exercise, and since the exercise capable of being done using professional equipment is limited, there is a problem in that users may easily get bored. In addition, in aerobic exercise done with equipment such as a treadmill, a set course is repeated so that the exercise process is monotonous. Thus, there is a problem in many cases where the user gives up on the exercise before finishing.

In order to overcome such problems, technologies that allow enjoying sports using virtual reality or augmented reality have been developed. Patent Publication No. 10-2020-0082990 (title of the invention: FITNESS MANAGEMENT METHOD THROUGH VR SPORTS) and the like have been disclosed as the related art.

However, the technology that enables enjoying sports using virtual reality in the related art has limitations in that it is difficult to obtain sufficient exercise effects due to inconvenient motions because the VR device should be worn on the head. In addition, there are limitations to using fitness or VR sports for the purpose of improving physical strength and education of children and adolescents, and the fitness or VR sports are mainly solo sports, whereby it is not suitable for promoting cooperation among children and adolescents.

In addition, user motion recognition has been performed using camera sensing in the related art. However, multi-user motion recognition cannot be performed simultaneously using camera sensing, so that the motion recognition should be performed separately for each user. As a result, there is a problem in that it is difficult for multiple users to enjoy sports together. Alternatively, a separate object should be used, and in this case, another problem that types of sports are limited has occurred.

Therefore, there is a need to develop a technology that allows multiple users to enjoy various sports together indoors.

DISCLOSURE

Technical Problem

The present invention has been made keeping in mind the above problems occurring in the related art, and an objective of the present invention is to provide an augmented reality based interactive sports device using a LiDAR sensor, which allows enjoying sports indoors only with the user's body without requiring a user to wear a separate object or device by projecting an image for sports content on the floor and tracking a user motion of the sports content using the LiDAR sensor to control the interaction between the sports content and the user, allows using the floor surface efficiently due to wide range of motion tracking, and allows quickly and accurately tracking a motion of each user by tracking a user motion using two LiDAR sensors even when multiple users are using sports content at the same time.

Technical Solution

In order to achieve the above objective, an augmented reality based interactive sports device using a LiDAR sensor according to the present invention is provided
the augmented reality based interactive sports device may include:
a main body;
a projector unit provided on a front surface of the main body to project an image for sports content on a floor surface;
a LiDAR sensor unit installed toward a projection direction of the projector unit;
a motion tracking unit recognizing a user's position according to the sports content using the LiDAR sensor unit to track a user motion;
a sensor connection unit having one end connected to a side surface of a lower end of the main body and other end connected to the LiDAR sensor unit, so that the LiDAR sensor unit is connected to be spaced apart from the main body by a predetermined distance; and
a control unit outputting the sports content through the projector unit to provide augmented reality based sports content to a user and controlling an interaction between the sports content and the user using the user motion tracked by the motion tracking unit.
Preferably, the LiDAR sensor unit
may include two LiDAR sensors connected to each of both side surfaces of the lower end of the main body through the sensor connection unit.
Preferably, the LiDAR sensor unit
may include:
an optical transmission module generating and emitting a laser;

an optical receiving module focusing optical signals scattered by the user's body; and an optical sensing module detecting the optical signals focused by the optical receiving module, and wherein the motion tracking unit tracks the user motion using the detected optical signals.

Preferably, the motion tracking unit may recognize a position of a user's foot at a predetermined point from the ground using the LiDAR sensor unit, and track the user motion by tracing a change in the position of the user's foot.

Preferably, the sensor connection unit may be connected to the side surface of the lower end of the main body by a hinge.

Preferably, Preferably, the augmented reality based interactive sports device may further include an auxiliary wheels installed at the lower end of the main body for the purpose of smooth movement.

Preferably, the augmented reality based interactive sports device may further include a communication unit performing communication with a trainer terminal, provides the user's sports content use information to the trainer terminal, receiving a control signal from the trainer terminal to transmit the control signal to the control unit, and providing the user with a non-contact based training guidance.

Preferably, the augmented reality based interactive sports device may further include a display unit provided on a front side of the main body to receive a selection signal of the sports content and output play information related to the sports content; and a speaker unit outputting a sound related to the sports content, and the display unit and the speaker unit may output a real-time trainer image that the communication unit receives from the trainer terminal.

Advantageous Effects

According to an augmented reality based interactive sports device using a LiDAR sensor proposed in the present invention, it is possible to allow enjoying sports indoors only with the user's body without requiring a user to wear a separate object or device by projecting an image for sports content on the floor and tracking a user motion of the sports content using the LiDAR sensor to control the interaction between the sports content and the user, allow using the floor surface efficiently due to wide range of motion tracking, and allow quickly and accurately tracking a motion of each user by tracking a user motion using two LiDAR sensors even when multiple users are using sports content at the same time.

DESCRIPTION OF NUMERALS

10: projection area
100: augmented reality based interactive sports device
110: main body
111: auxiliary wheel
120: projector unit
130: LiDAR sensor unit
130a: first sensor unit
130b: second sensor unit
131: optical transmission module
132: optical receiving module
133: optical sensing module
140: motion tracking unit
150: sensor connection unit
160: control unit
170: communication unit
180: display unit
190: speaker unit Best Mode Hereinafter, preferred embodiments of the present invention will be described in detail with reference to the accompanying drawings so that those skilled in the art can easily carry out the present invention. In the following detailed description of the preferred embodiments of the present invention, a detailed description of known functions and configurations incorporated herein will be omitted when it may make the subject matter of the present invention unclear. The same reference numerals are used for portions having similar functions and configurations throughout the drawings.

In addition, throughout the specification, when a part is referred to as being "connected" to other part, it includes not only the case that the part is "directly connected" to the other part, but also the case that the part is "indirectly connected" to the other part with another device in between. In addition, "comprising any component" means that other components may be further included, rather than excluding other components, unless specifically stated otherwise.

Figure 1:
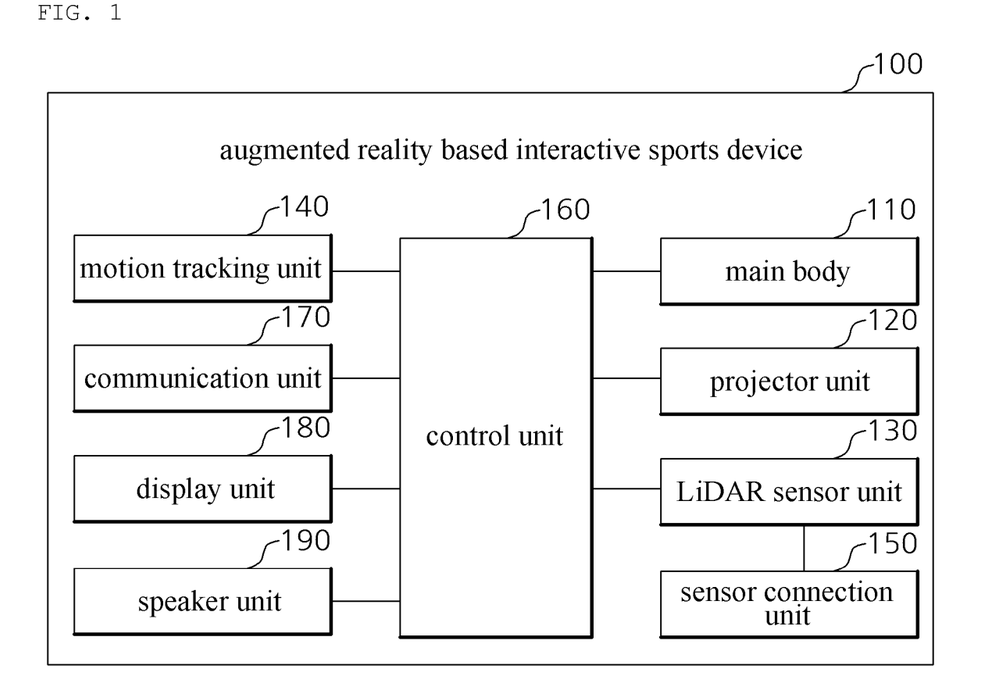
FIG. 1 is a diagram showing a configuration of an augmented reality based interactive sports device using a LiDAR sensor, according to an embodiment of the present invention.
Figure 2:
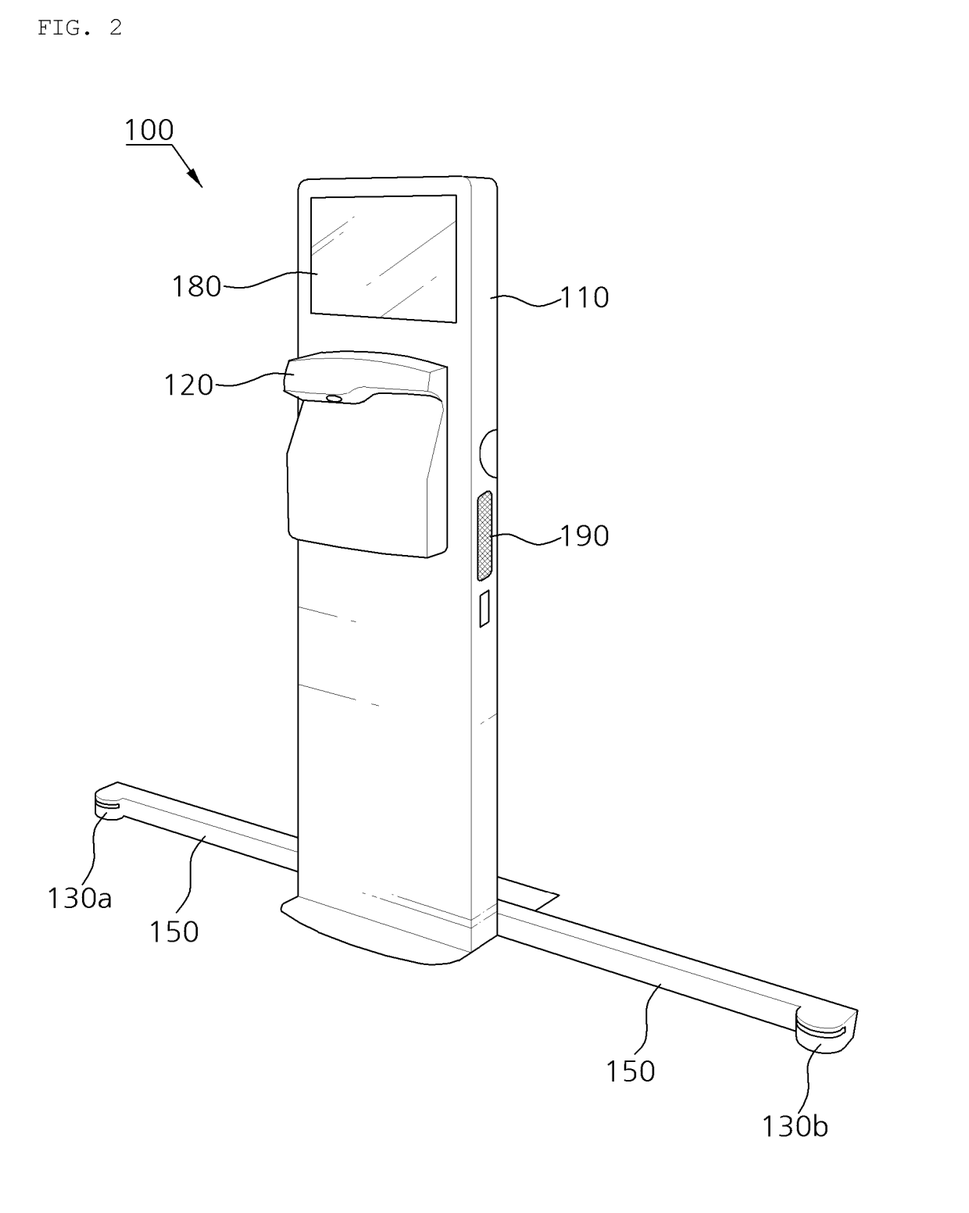
FIGS. 2 and 3 are diagrams showing the appearance of an augmented reality based interactive sports device using a LiDAR sensor, according to an embodiment of the present invention.
Figure 3:
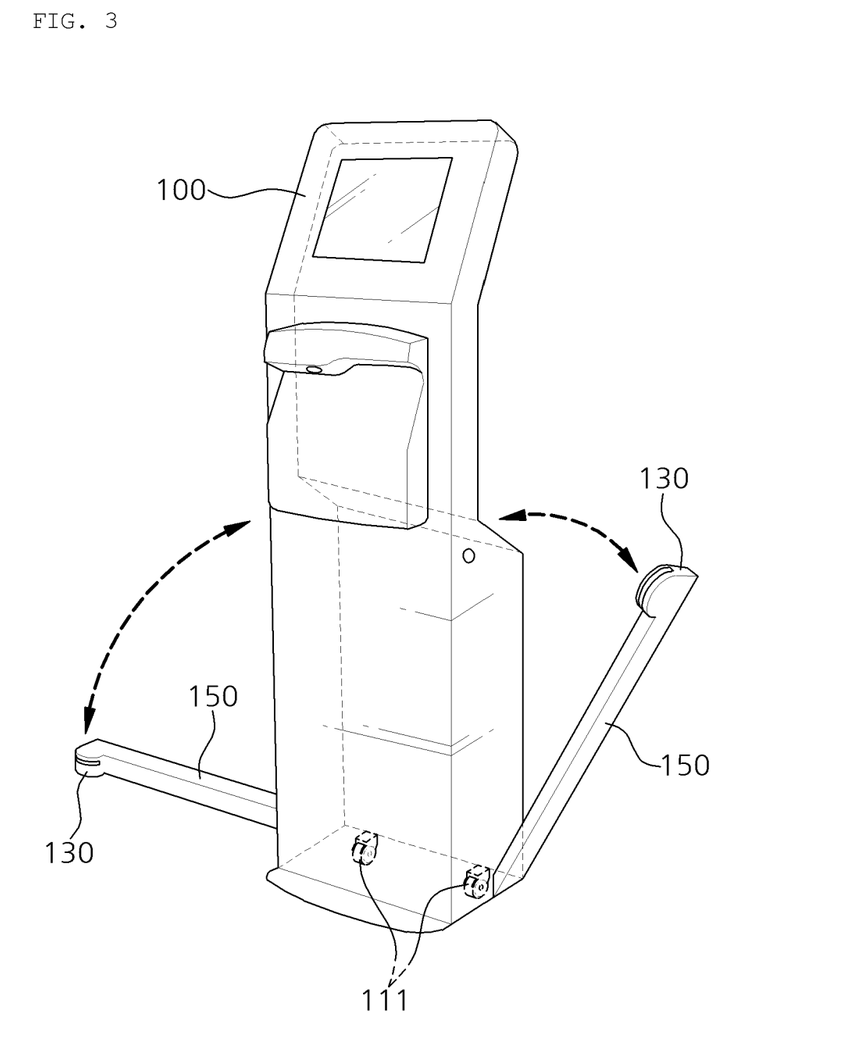

FIG. 1 is a diagram showing a configuration of an augmented reality based interactive sports device using a LiDAR sensor according to an embodiment of the present invention, and FIGS. 2 and 3 are diagrams showing the appearance of an augmented reality based interactive sports device using a LiDAR sensor according to an embodiment of the present invention. As shown in FIGS. 1 to 3, the augmented reality based interactive sports device 100 using the LiDAR sensor according to an embodiment of the present invention may be configured to include a main body 110, a projector unit 120, a LiDAR sensor unit 130, a motion tracking unit 140, a sensor connection unit 150, and a control unit 160, and to further include a communication unit 170, a display unit 180, and a speaker unit 190.

The main body 110 may be a frame constituting the body of the augmented reality based interactive sports device 100, and may include a computer device with the control unit 160 mounted on its inner surface. The main body 110 may have a rectangular parallelepiped shape as shown in FIG. 2 or a shape as shown in FIG. 3, but a specific shape thereof may be variously implemented. In particular, as shown in FIG. 3, the augmented reality based interactive sports device 100 further includes at least one auxiliary wheel 111 at a lower end of the main body 110 for the purpose of smooth movement, to make it possible to be implemented in a movable manner, whereby a user may enjoy sports content while freely moving place to place as needed.

The projector unit 120 is provided on the front of the main body 110 to project an image for sports content on the floor surface. As shown in FIG. 2, the projector unit is provided on the front of the main body 110 so that the user may be provided with sports content in front of the main body 110. In addition, the projector unit may be also installed to adjust the direction so that image is projected on the floor instead of a wall.

Figure 4:
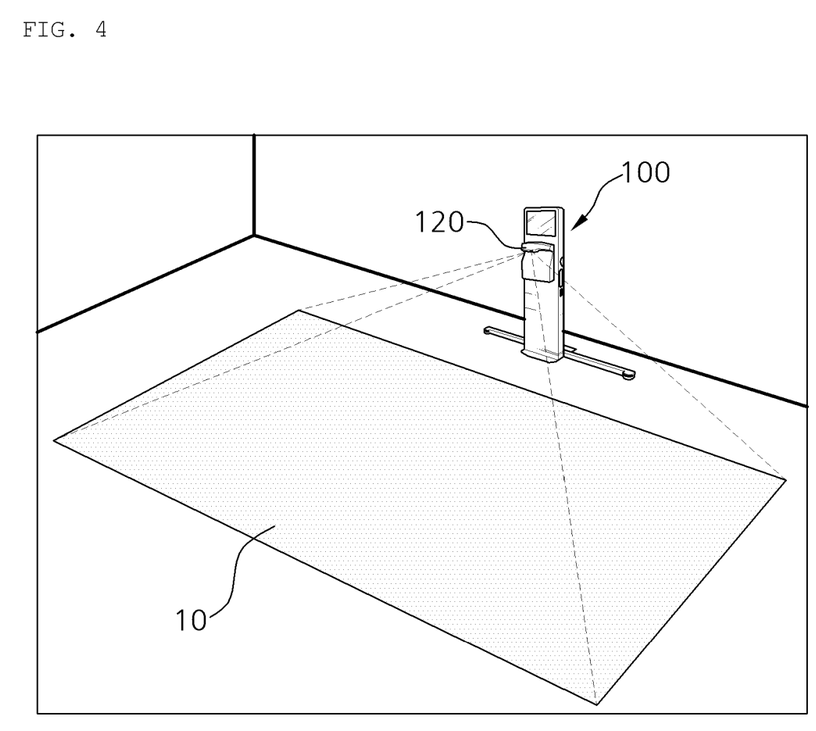
FIG. 4 is a diagram showing a projection area of a projector unit in an augmented reality based interactive sports device using a LiDAR sensor, according to an embodiment of the present invention.

FIG. 4 is a diagram showing a projection area 10 of a projector unit 120 in an augmented reality based interactive sports device using a LiDAR sensor, according to an embodiment of the present invention. As shown in FIG. 4, the projector unit 120 of the augmented reality based interactive sports device 100 using the LiDAR sensor according to an embodiment of the present invention may project a projection area 10 in the form of a rectangle on the floor surface. Since the floor surface is fully utilized by the projector unit 120, various sports content may be provided by utilizing the projection area 10 that is much wider than when using a display device such as a monitor, a mobile terminal, a TV, or the like. For example, the projection area 10 may have a size of 4.5 m×2.6 m. Meanwhile, the projector unit 120 may project the image by correcting the distortion so that the projection area 10 may have a shape in a right-angled rectangle not in a rhombic shape or the like.

The LiDAR sensor unit 130 may be installed toward the projection direction of the projector unit 120. That is, in order to recognize a motion of a user using sports content in the projection area 10, the LiDAR sensor unit 130 may be disposed to cover the projection area 10. Herein, the LiDAR sensor included in the LiDAR sensor unit 130 may be RP LiDAR A3, and the laser scanning range may be on the order of 20 m. In particular, the LiDAR sensor unit 130 may be configured to include two LiDAR sensors 130*b* and 130*b*. A detailed configuration of the LiDAR sensor unit 130 will be described in detail later with reference to FIG. 5.

The motion tracking unit 140 may track a user motion by recognizing the user's position according to the sports content using the LiDAR sensor unit 130. More specifically, the motion tracking unit 140 may use the LiDAR sensor unit 130 to recognize the position of the user's foot at a predetermined point from the ground, and track the user's motion by tracing a change in position of the user's foot. That is, the LiDAR sensor unit 130 may perform laser scanning for a plane at a height of about 5 cm from the ground to detect the presence and position of the user's foot. The motion tracking unit 140 may track a change in the position of the user's foot as the user motion.

Figure 5:
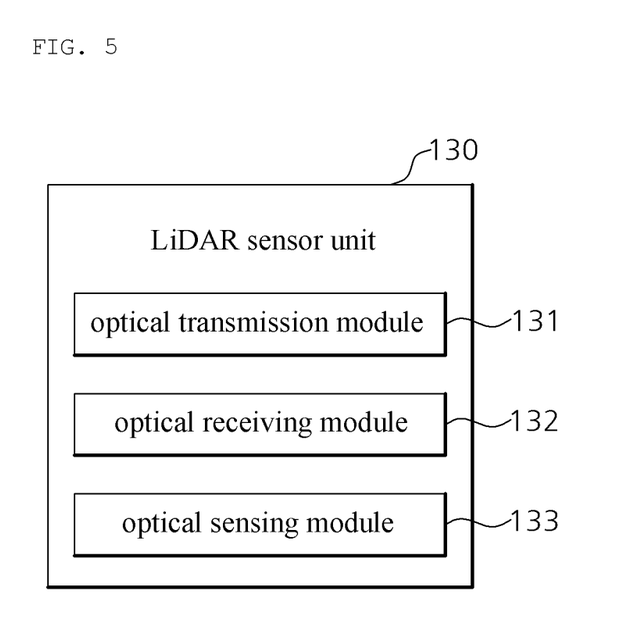
FIG. 5 is a diagram showing a detailed configuration of a LiDAR sensor unit in an augmented reality based interactive sports device using a LiDAR sensor, according to an embodiment of the present invention.

FIG. 5 shows a detailed configuration of a LiDAR sensor unit 130 in the augmented reality based interactive sports device 100 using the LiDAR sensor according to an embodiment of the present invention. As shown in FIG. 5, the LiDAR sensor unit 130 in the augmented reality based interactive sports device 100 according to an embodiment of the present invention may be configured to include an optical transmission module 131 that generates and emits lasers, an optical receiving module 132 that focuses optical signals scattered by the user's body; and an optical sensing module 133 that detects the optical signals focused by the optical receiving module 132. The motion tracking unit 140 may track a user motion using the detected optical signals.

In the user motion tracking method in the related art, visual sensing using cameras has been widely used. For example, a high-speed camera sensor, a 3D depth camera sensor, a Kinetic camera sensor, or the like may be used. With respect to the high-speed camera sensor, although it may be used for virtual reality exercise, there are limitations that continuous tracking for data processing is not possible, only one user may use the camera sensor at a fixed location, and a separate object is required. Because the 3D depth camera sensor detects and uses a change value at a specific depth, there are limitations that an event must be generated at a specific depth, only a small number of one to ten users can use the camera sensor at the same time, and a separate object is also required. Although the Kinetic camera sensor detects motions of a subject, there are limitations that the Kinetic camera sensor has a narrow sensing range due to an angle of view of the camera so that the user should exercise at a fixed position, resulting in narrow range of activity, and only one user may use the Kinetic camera sensor at a time.

In order to solve the limitations of the related art as described above, since the augmented reality based interactive sports device 100 using the LiDAR sensor according to an embodiment of the present invention includes a LiDAR sensor unit 130 and the motion tracking unit 140, the user may enjoy augmented reality sports only with his/her body without requiring the user to wear a separate object or device. Further, since a motion tracking range is wider so that the user may sufficiently use the floor surface including the projection area 10, it is possible for the user to exercise while moving around. In addition, since the LiDAR sensor unit 130 may track the positions of one to 30 people at the same time, the present invention may be applied to group sports, thereby providing the fun of exercising together and helping to develop a sense of cooperation.

The sensor connection unit 150 has one end connected to a side surface of a lower end of the main body 110 and the other end connected to the LiDAR sensor unit 130, so that the LiDAR sensor unit 130 may be connected to be spaced apart from the main body 110 by a predetermined distance. More specifically, as shown in FIGS. 2 and 3, the sensor connection unit 150 may be connected to both sides of the body 110 in a bar shape, and the length of the sensor connection unit 150 may be about 80 to 120 cm, and more specifically, 100 cm. In addition, as shown in FIG. 3, since the sensor connection unit 150 is connected to the side surface of the lower end of the main body 110 via a hinge, the augmented reality based interactive sports device 100 may be conveniently kept or moved by folding the sensor connection unit 150 when not in use or when moving.

Meanwhile, the LiDAR sensor unit 130 may include two LiDAR sensors connected to each of both sides of the lower end of the main body 110 through the sensor connection unit 150. In particular, in the augmented reality based interactive sports device 100 using a LiDAR sensor according to an embodiment of the present invention, multiple users may be tracked quickly and accurately by tracking the user motion using two LiDAR sensors.

Figure 6:
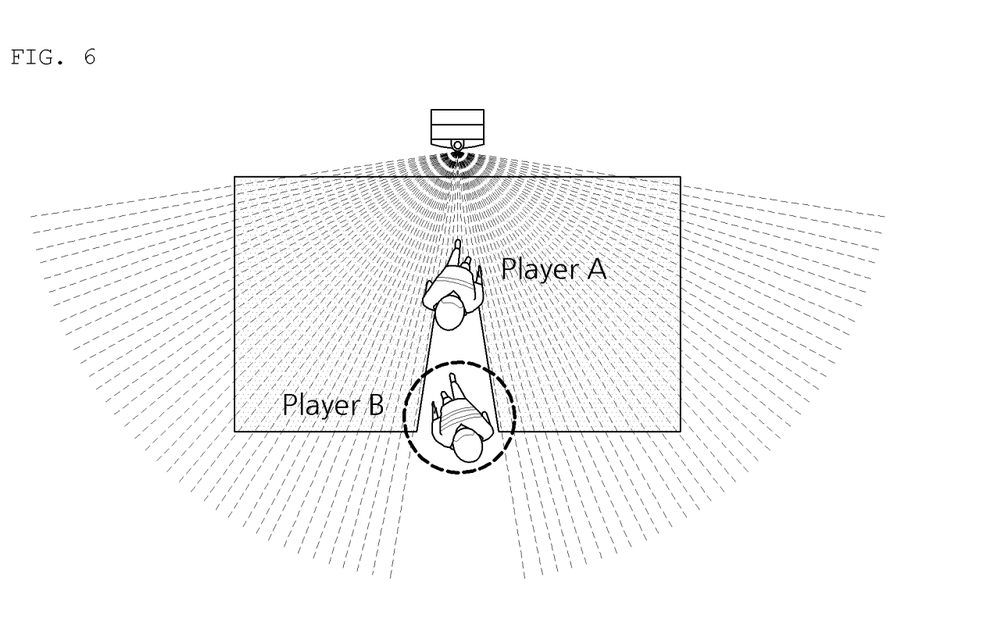
FIG. 6 is a diagram showing a single LiDAR sensor in an augmented reality based interactive sports device using a LiDAR sensor, according to an embodiment of the present invention.
Figure 7:
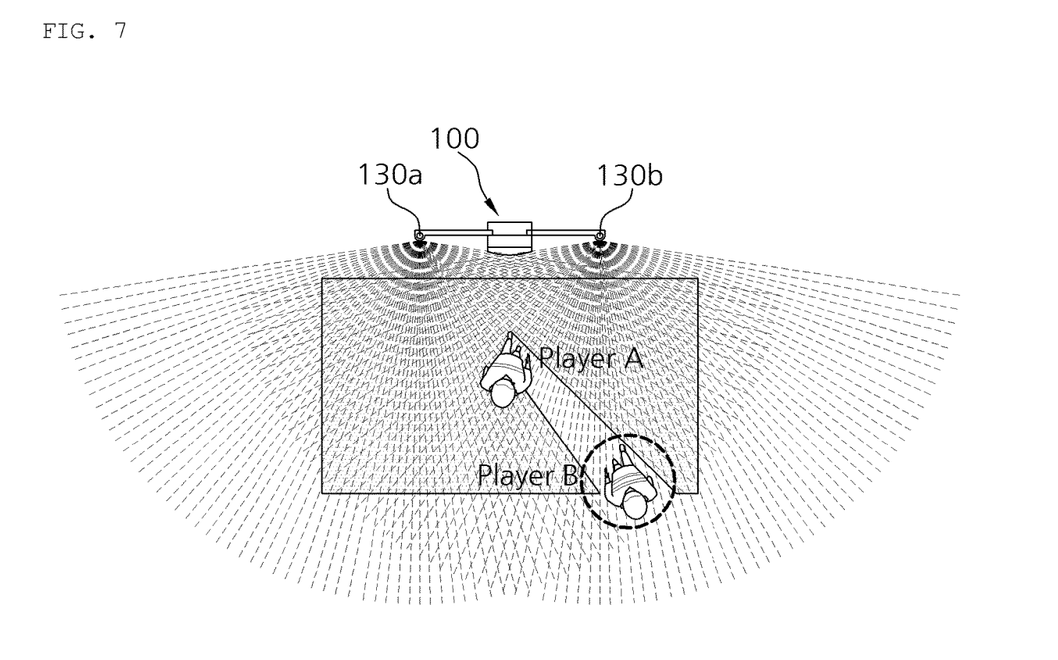
FIG. 7 is a diagram showing a dual LiDAR sensor in an augmented reality based interactive sports device using a LiDAR sensor, according to an embodiment of the present invention.

FIG. 6 is a diagram showing a single LiDAR sensor in an augmented reality based interactive sports device 100 using a LiDAR sensor according to an embodiment of the present invention, and FIG. 7 is a diagram showing a dual LiDAR sensor in an augmented reality based interactive sports device 100 using a LiDAR sensor according to an embodiment of the present invention. In the augmented reality based interactive sports device 100 using the LiDAR sensor according to an embodiment of the present invention, user motion tracking may be performed using single LiDAR sensor, as shown in FIG. 6. When using two LiDAR sensors as shown in FIG. 7, tracking failure due to relative positions of users may be avoided, and the positions of several users may be accurately identified without interference.

When the LiDAR sensor is used, a laser scanning shadow obscured by an object not to be reached by the laser is generated, so that the object located in the laser scanning shadow may not be detected. In the single LiDAR sensor, as long as the positions of two users do not overlap, there is no problem in motion tracking of each user. However, as shown in FIG. 6, when a player B is located in the laser scanning shadow of a player A, the player B may be not tracked.

Meanwhile, when two LiDAR sensors (dual LiDAR sensor) are used, the laser scanning shade area by the first LiDAR sensor unit 130a is scanned by the second LiDAR sensor unit 130b, so that the motion tracking of multiple users may be performed at the same time without interference. That is, as shown in FIG. 7, even when the player B is located in the laser scanning shadow by the first LiDAR sensor unit 130a of the player A, the motion of the player B may be tracked by the second LiDAR sensor unit 130b.

The control unit 160 outputs sports content through the projector unit 120 to provide the user with augmented reality based sports content. The control unit 14 may control interaction between the sports content and the user by using a user motion tracked by the motion tracking unit 140. That is, the control unit 160 may convert the user motion tracked by the motion tracking unit 140 into an input signal of the sports content to deliver the same, for the purpose of the interaction between the sports content and the user.

The communication unit 170 performs communication with the trainer terminal, provides the user's sports content use information to the trainer terminal, receives a control signal from the trainer terminal and transmits the same to the control unit 160, and provides the user with non-contact based training guidance. Here, it may be understood that various wireless communication methods may be applied to the communication unit 170, including Wi-Fi (Wireless Fidelity) with internet access, mobile radio communication network, satellite network, Bluetooth, Wibro (Wireless Broadband Internet), 3/4/5th Generation Mobile Telecommunication (3G/4G/5G), and LTE (Long Term Evolution).

The display unit 180 is provided on the front of the main body 110 to receive a selection signal of sports content and output play information related to the sports content. That is, as shown in FIG. 2, the display unit 180 may be located on the front side of the main body 110 and may be implemented as a touch screen so that the user may input or read user information and select sports content, etc., to enable various input/output.

The speaker unit 190 may output a sound related to the sports content. The speaker may be installed on the front surface or side surface of the main body 110, and the volume thereof may be adjusted through the display unit 180.

In particular, the augmented reality based interactive sports device 100 using a LiDAR sensor according to an embodiment of the present invention is configured to include a projector unit 120, a LiDAR sensor unit 130, a motion tracking unit 140, a control unit 160, a communication unit 170, a display unit 180, and a speaker unit 190, so that a user may place the main body 110 at a specific place to easily enjoy sports content at the place.

Figure 8:
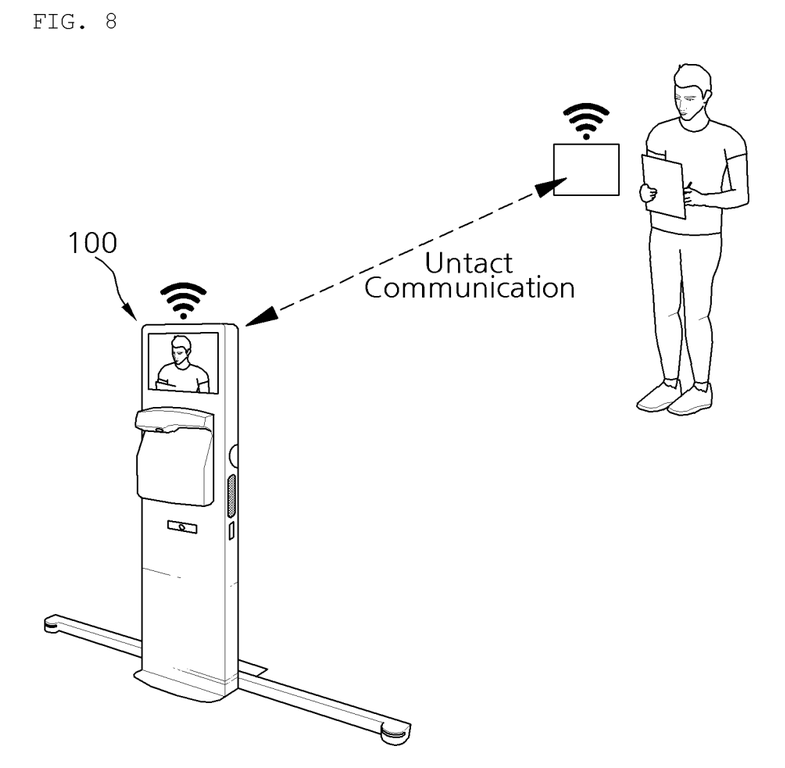
FIG. 8 is a diagram showing a state in which an augmented reality based interactive sports device using a LiDAR sensor communicates with a trainer terminal, according to an embodiment of the present invention.

FIG. 8 is a diagram illustrating a state in which the augmented reality based interactive sports device 100 using the LiDAR sensor communicates with a trainer terminal, according to an embodiment of the present invention. As shown in FIG. 8, the augmented reality based interactive sports device 100 using the LiDAR sensor according to an embodiment of the present invention receives control signals from the trainer terminal through the communication unit 170 and remotely provide training service. The trainer may install the application in the terminal to receive and check the user's exercise data from the augmented reality based interactive sports device 10 and to provide each user with training data, such as recommending appropriate sports content to each user or coaching an exercise posture, exercise time, and the like.

Here, the trainer terminal may be implemented as an electronic device. The electronic device may include at least one of a smartphone, a tablet, a PC (personal computer), a mobile phone, a video phone, an e-book reader, a desktop PC, a laptop PC, a netbook computer, a workstation, a server, PDA (personal digital assistant), a media box, a game console, an electronic dictionary, or a wearable device. The wearable device may include at least one of accessory types (e.g. watches, rings, bracelets, anklets, necklaces, eyeglasses, contact lenses, or HMD (head mounted device)), all-in-one types of fabric or clothing (e.g. electronic clothing), body-worn types (e.g. a skin pad or tattoo), or an implantable circuit. According to various embodiments, the electronic device is not limited to the aforementioned devices, and may be a combination of two or more of the aforementioned various devices.

Meanwhile, the display unit 180 and the speaker unit 190 may output a real-time trainer image that the communication unit 170 receives from the trainer terminal. That is, as shown in FIG. 8, by outputting the real-time trainer image to the display unit 180 and the speaker unit 190, the user and the trainer may remotely provide or receive training service without direct face-to-face contact. To this end, a camera may be provided on the front of the main body 110 to capture a user using sports content, and the captured image may be transmitted to the trainer terminal using the communication unit 170.

As describe above, according to an augmented reality based interactive sports device using a LiDAR sensor proposed in the present invention, it is possible to allow enjoying sports indoors only with the user's body without requiring a user to wear a separate object or device by projecting an image for sports content on the floor and tracking a user motion of the sports content using the LiDAR sensor to control the interaction between the sports content and the user, allow using the floor surface efficiently due to wide range of motion tracking, and allow quickly and accurately tracking a motion of each user by tracking a user motion using two LiDAR sensors even when multiple users are using sports content at the same time.

The present invention described above can be variously modified or applied by those of ordinary skill in the art to which the present invention pertains, and the scope of the technical idea according to the present invention should be defined by the following claims.

The invention claimed is:

1. An augmented reality based interactive sports device (100) using a LiDAR sensor, the augmented reality based interactive sports device (100) comprising:
    a main body (110);
    a projector unit (120) provided on a front surface of the main body (110) to project an image for sports content on a floor surface;
    a LiDAR sensor unit (130) installed toward a projection direction of the projector unit (120);
    a motion tracking unit (140) recognizing a user's position according to the sports content using the LiDAR sensor unit (130) to track a user motion;
    a sensor connection unit (150) having one end connected to a side surface of a lower end of the main body (110) and other end connected to the LiDAR sensor unit (130), so that the LiDAR sensor unit (130) is connected to be spaced apart from the main body (110) by a predetermined distance; and
    a control unit (160) outputting the sports content through the projector unit (120) to provide augmented reality based sports content to a user and controlling an interaction between the sports content and the user using the user motion tracked by the motion tracking unit (140),
    wherein,
    the LiDAR sensor unit (130) comprises two or more LiDAR sensors connected to each of both side surfaces of the lower end of the main body (110) through the sensor connection unit (150) avoids tracking failure in the laser scanning shade area due to the relative position of a plurality of users, and determines the location of each user;
    the motion tracking unit (140) recognizes a position of a user's foot by laser scanning a plane at a predetermined height from the ground using the LiDAR sensor unit (130), and tracks the user motion by tracing a change in the position of the user's foot; and
    multiple users are capable of playing team sports simultaneously using the sports content.

2. The augmented reality based interactive sports device (100) of claim 1, wherein the LiDAR sensor unit (130) comprises:
    an optical transmission module (131) generating and emitting a laser;
    an optical receiving module (132) focusing optical signals scattered by the user's body; and
    an optical sensing module (133) detecting the optical signals focused by the optical receiving module (132), and
    wherein the motion tracking unit (140) tracks the user motion using the detected optical signals.

3. The augmented reality based interactive sports device (100) of claim 1, wherein the sensor connection unit (150) is connected to the side surface of the lower end of the main body (110) by a hinge.

4. The augmented reality based interactive sports device (100) of claim 1, further comprising:
    an auxiliary wheels (111) installed at the lower end of the main body (110) for the purpose of smooth movement.

5. The augmented reality based interactive sports device (100) of claim 1, further comprising:
    a communication unit (170) performing communication with a trainer terminal, providing the user's sports content use information to the trainer terminal, receiving a control signal from the trainer terminal to transmit the control signal to the control unit (160), and providing the user with a non-contact based training guidance.

6. The augmented reality based interactive sports device (100) of claim 5, further comprising:
    a display unit (180) provided on a front side of the main body (110) to receive a selection signal of the sports content and output play information related to the sports content; and
    a speaker unit (190) outputting a sound related to the sports content, and
    wherein the display unit (180) and the speaker unit (190) output a real-time trainer image that the communication unit (170) receives from the trainer terminal.

* * * * *